United States Patent
Maroney

(10) Patent No.: US 9,991,703 B1
(45) Date of Patent: Jun. 5, 2018

(54) DUAL WALL INPUT FOR NETWORK ATTACHED STORAGE DEVICE

(75) Inventor: John E. Maroney, Irvine, CA (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 755 days.

(21) Appl. No.: 13/436,851

(22) Filed: Mar. 31, 2012

(51) Int. Cl.
*H02J 1/10* (2006.01)

(52) U.S. Cl.
CPC ..................... *H02J 1/10* (2013.01)

(58) Field of Classification Search
CPC .......................................................... H02J 1/10
USPC ...................................... 307/52–53
See application file for complete search history.

(56) References Cited

U.S. PATENT DOCUMENTS

| | | | | |
|---|---|---|---|---|
| 5,319,536 A * | 6/1994 | Malik | | 363/65 |
| 5,428,524 A * | 6/1995 | Massie | | G05F 1/59 307/44 |
| 5,790,394 A * | 8/1998 | Cabaniss | | H02J 1/108 307/82 |
| 6,028,755 A * | 2/2000 | Saeki | | H02H 7/1213 323/285 |
| 6,091,609 A | 7/2000 | Hutson et al. | | |
| 6,153,946 A * | 11/2000 | Koch | | H02J 1/108 307/64 |
| 6,177,790 B1 | 1/2001 | Emberty et al. | | |
| 6,301,133 B1 * | 10/2001 | Cuadra | | H02J 1/102 363/65 |
| 6,433,444 B1 * | 8/2002 | de Vries | | H02J 1/10 307/64 |
| 6,525,435 B2 * | 2/2003 | Lau | | H02J 1/102 307/52 |
| 6,630,753 B2 * | 10/2003 | Malik | | H02J 9/061 307/64 |
| 6,859,882 B2 | 2/2005 | Fung | | |
| 7,049,711 B2 * | 5/2006 | Kanouda et al. | | 307/66 |
| 7,205,681 B2 * | 4/2007 | Nguyen | | H02J 1/10 307/18 |
| 7,243,248 B1 | 7/2007 | Roux et al. | | |
| 7,394,674 B2 * | 7/2008 | Huang | | G06F 1/30 307/64 |
| 7,612,467 B2 | 11/2009 | Suzuki et al. | | |

(Continued)

FOREIGN PATENT DOCUMENTS

JP         2011205796 A    * 10/2011

*Primary Examiner* — Adi Amrany
(74) *Attorney, Agent, or Firm* — Chang & Hale LLP

(57) ABSTRACT

The present invention relates to providing reliable power to a storage device. In one embodiment, the storage device employs dual external power supplies. The power supplies may both provide power to the storage device. Alternatively, the power supplies may provide power in different configurations. One power supply may be a primary supply providing all or a majority of power, while the other power supply may be a backup. The storage device may comprise high efficiency DC-to-DC converters to permit the use of lower power-rated external power supplies. A staggered startup procedure by the storage device may be implemented to manage peak power draw. The storage device may be further configured to load balance and power share between the external power supplies. In addition, the storage device is configured to monitor the status of the external power supplies and send a notification if one or more of the power supplies fails.

21 Claims, 3 Drawing Sheets

(56) References Cited

U.S. PATENT DOCUMENTS

| | | | | |
|---|---|---|---|---|
| 7,679,217 B2* | 3/2010 | Dishman | | H02J 1/10 307/64 |
| 7,898,111 B1* | 3/2011 | Pistel | | H02J 1/102 307/82 |
| 8,223,518 B2* | 7/2012 | Luu | | H02J 1/102 323/272 |
| 8,232,680 B2* | 7/2012 | DiMarco | | H02J 9/062 307/125 |
| 8,310,100 B2* | 11/2012 | Humphrey | | H02M 1/32 307/80 |
| 8,441,823 B2* | 5/2013 | Mechi | | H02M 1/4216 363/127 |
| 8,941,976 B1* | 1/2015 | Maroney | | H04B 3/56 340/855.9 |
| 9,535,472 B1* | 1/2017 | Maroney | | G06F 1/26 |
| 2002/0067630 A1* | 6/2002 | Tokunaga et al. | | 363/125 |
| 2002/0124128 A1 | 9/2002 | Qiu | | |
| 2003/0016515 A1 | 1/2003 | Jackson et al. | | |
| 2003/0212857 A1* | 11/2003 | Pacheco | | G11B 19/20 711/114 |
| 2003/0222618 A1* | 12/2003 | Kanouda | | G06F 1/30 320/116 |
| 2004/0003306 A1* | 1/2004 | Oomori | | G06F 1/263 713/300 |
| 2006/0232136 A1* | 10/2006 | Hirsch et al. | | 307/46 |
| 2007/0105415 A1* | 5/2007 | Jin | | H01R 13/6675 439/122 |
| 2007/0198748 A1* | 8/2007 | Ametsitsi | | H04B 3/542 709/249 |
| 2007/0208958 A1* | 9/2007 | Wakamatsu | | G06F 11/2015 713/300 |
| 2008/0052544 A1* | 2/2008 | Hsieh | | H02J 1/14 713/300 |
| 2008/0052551 A1* | 2/2008 | Chapuis | | G06F 1/26 713/340 |
| 2008/0076279 A1* | 3/2008 | Wu | | H01R 31/06 439/131 |
| 2008/0082849 A1* | 4/2008 | Takahashi | | G06F 1/263 713/340 |
| 2008/0093926 A1 | 4/2008 | Suzuki et al. | | |
| 2008/0146265 A1* | 6/2008 | Valavi | | G06F 1/1626 455/550.1 |
| 2009/0021217 A1* | 1/2009 | Nakazawa | | H01M 2/34 320/134 |
| 2009/0085533 A1* | 4/2009 | Devine | | G05F 1/652 323/268 |
| 2009/0147393 A1* | 6/2009 | Hakamata | | G06F 1/3221 360/69 |
| 2009/0167089 A1* | 7/2009 | Dishman | | H02J 1/10 307/64 |
| 2009/0227122 A1* | 9/2009 | Jubelirer | | H01R 31/065 439/11 |
| 2010/0042855 A1* | 2/2010 | Karam | | H04L 12/10 713/310 |
| 2010/0102633 A1* | 4/2010 | Seaton | | H02J 9/06 307/64 |
| 2011/0205769 A1* | 8/2011 | Blackwell | | H02J 1/10 363/65 |
| 2011/0234000 A1* | 9/2011 | Yan | | H02M 3/157 307/31 |
| 2011/0278923 A1* | 11/2011 | Pance | | H01R 13/7039 307/31 |
| 2012/0098334 A1* | 4/2012 | Holmberg | | G06F 1/32 307/12 |
| 2012/0104860 A1* | 5/2012 | Feng | | H02J 1/10 307/80 |
| 2012/0200300 A1* | 8/2012 | Lamb | | H02H 3/20 324/537 |
| 2012/0242151 A1* | 9/2012 | Seaton | | G06F 1/30 307/65 |
| 2014/0001871 A1* | 1/2014 | Vogman | | 307/82 |

* cited by examiner

DUAL WALL INPUT FOR NETWORK ATTACHED STORAGE DEVICE

BACKGROUND

Network attached storage ("NAS") refers to any data storage device that can be connected to a network provides data to various clients, such as host computers. NAS devices have become popular, even in small offices and home environments, because that enable sharing of files among multiple computers.

Typically, a NAS is constructed as a specialized computer or appliance. As such, internal power supplies predominantly power NAS devices. In particular, Advanced Technology Extended ("ATX") power supplies power the majority of NAS devices. The ATX standard, among other things, specifies the form factor and configuration of power supplies for computer devices like NAS devices. ATX power supplies are common because of the power requirements of devices like NAS devices.

Unfortunately, ATX power supplies have several disadvantages. ATX power supplies are costly. ATX power supplies produce heat and may greatly increase the cooling requirements, which in turn increases power consumption. ATX power supplies can also be inefficient and waste electricity even when the NAS device is inactive.

BRIEF DESCRIPTION OF THE DRAWINGS

Systems and methods which embody the various features of the invention will now be described with reference to the following drawings, in which.

DETAILED DESCRIPTION

Figure 1:
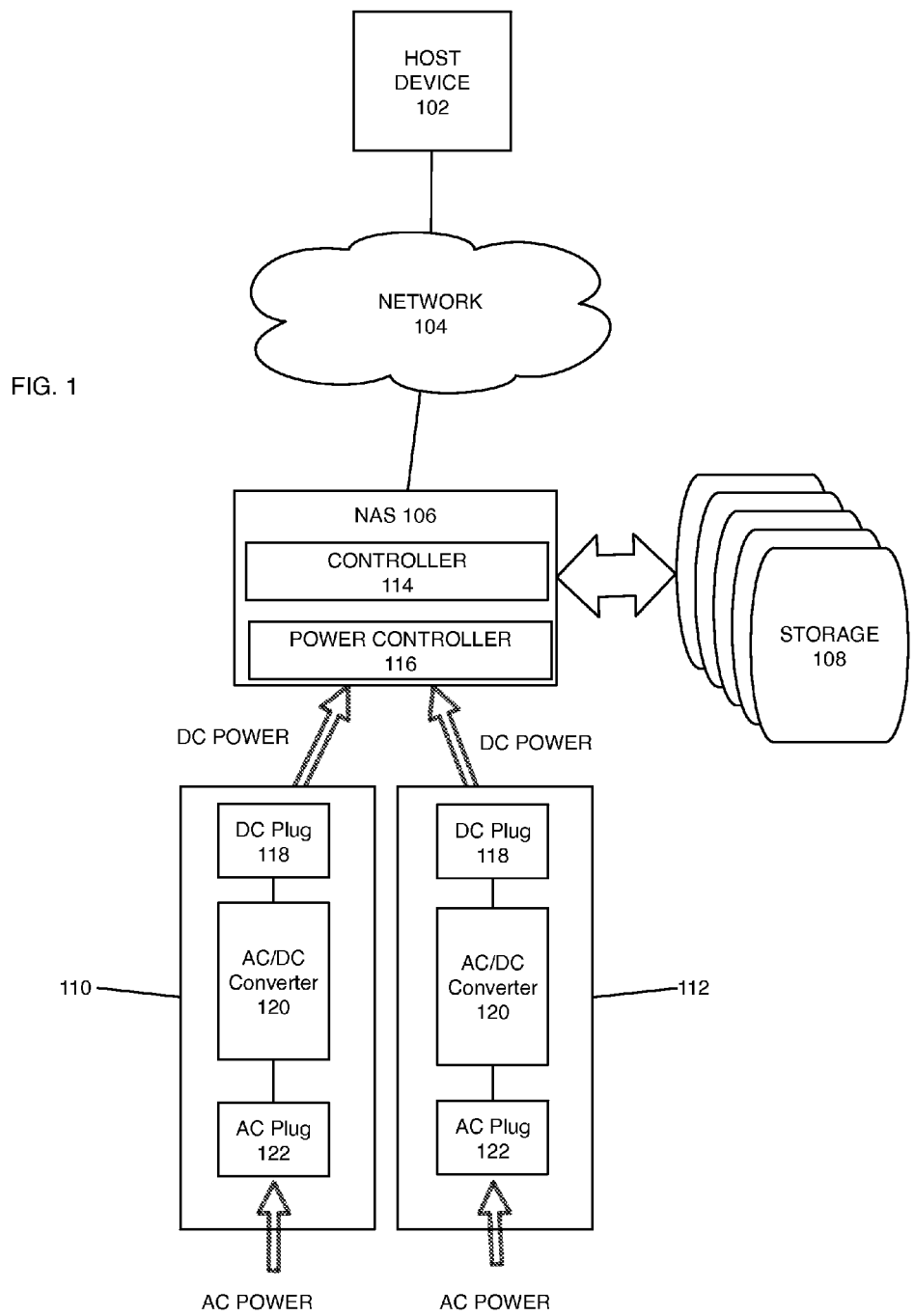
FIG. 1 shows an exemplary system consistent with one embodiment of the present invention.

One embodiment provides reliable power to a network-attached storage ("NAS") device. Rather than a single internal power supply, such as an ATX power supply, the storage device of one embodiment employs a plurality external power supplies. In one embodiment, the NAS device is powered by a plurality of external AC-to-DC adapter power supplies. For example, a pair of external AC adapter power supplies may power the NAS device.

The external power supplies may power the NAS device in a plurality of configurations. For example, the external power supplies may collectively power the NAS device as a group. The external AC adapter power supplies may share the power load in equal or unequal proportions. In another embodiment, one external AC adapter power supply is a primary power supply of the NAS device that supplies all or a substantial portion of the power to the NAS device. One or more additional AC adapter power supplies may then provide a smaller proportion of the power and/or serve as a backup to the primary power supply.

In addition, in order to operate with external AC adapter power supplies, the NAS device comprises one or more high efficiency DC-to-DC converters. In one embodiment, the NAS device comprises a DC-to-DC converter that is at least 80% efficient.

In one embodiment, the storage device is configured to use lower rated components in the external power supplies, such as 120-Watt components. For example, in contrast, conventional ATX internal power supplies are typically rated at 380 Watts or more. The NAS storage device may employ multiple external power supplies having the same rating, such as 120-Watts or less. Alternatively, the NAS storage device may employ one or more primary power supplies having a higher rating than other power supplies.

The storage device may implement various features to accommodate a plurality of external power supplies. In one embodiment, the storage device employs a staggered startup procedure in order to keep the peak power draw within the ratings of these external power supplies. In one embodiment, the storage device may be configured to dynamically determine which and how many disk drives to start based on the power draw. As another example, the storage device may be configured to stagger startup of its disk drives based on a fixed or variable time period.

The use of multiple external power supplies in one embodiment provides several advantages. The storage device may be configured to load balance and share power between the multiple power supplies. Alternatively, the storage device may utilize one power supply as a primary supply and its other supplies as a standby, backup supply.

The storage device may be configured to monitor and sense the status of the external power supplies, and if necessary, send a notification if one or more of the power supplies fails. Since the power supplies are external, any of the power supplies may be replaced or repaired, for example, even during operations of the storage device.

As another advantage, due to their external location, the power supplies are removed as a source of heat from the storage device. This allows the storage device to have better longevity and reliability. In addition, electrical noise generated by the power supplies may be shielded or minimized based on their external placement of the power supply away from the storage device.

Furthermore, the use of external power supplies by one embodiment allows the storage device to be used with different power sources, such as different voltage mains and/or battery power. External power supplies may also be more energy efficient than conventional internal power supplies.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of one embodiment, reference will now be made to the figures.

FIG. 1 shows a system 100 in which one embodiment may be implemented. As shown, the system 100 may comprise a host device 102, a network 104, and a storage device 106. The storage device 106 may be implemented as a NAS device having a plurality storage media 108, which is powered by external power supplies 110 and 112. The storage device 106 may comprise a power controller 114 to interface and receive power from external power supplies 110 and 112. These components will now be further described.

Host device 102 refers to any computing device used to access files shared by storage device 106. For example, the host device 102 may be a personal computer, a laptop computer, a tablet computer, a mobile phone, etc. Such devices are well known to those skilled in the art.

Network 104 provides a communications infrastructure for communications between the host device 102 and the storage device 106. Network 104 may comprise various components and network elements, such as routers, switches, hubs, etc.

The network 104 may support various communications protocols, such as Ethernet, Internet protocols, etc. In addition, the network 104 may be implemented as a wired or wireless network or a combination thereof.

Storage device 106 refers to any data storage device capable of providing or sharing access to a file. Storage device 106 may be implemented as a hard disk drive, a solid-state drive, a hybrid drive, etc.

In the present disclosure, by way of example, storage device 106 is implemented as a NAS device. As a NAS device, the storage device 106 provides file level access and shares files with host device 102 over network 104. The storage device 106 may be implemented using known hardware, firmware, and software. For example, as a NAS device, the storage device 106 may be implemented as a specialized computer or appliance configured to store and serve files over the network 104.

As shown, the storage device 106 may comprise, among other things, a controller 114 and power controller 116. The controller 114 comprises the hardware, firmware, and software for controlling the operations of the storage device 106. For example, the controller 114 may manage communications between the host device 102 and the storage 108 to write and read data. In one embodiment, the controller 114 manages the storage 108 and presents them to the host device 102 as logical devices.

In addition, the controller 114 is configured to accommodate external power supplies. In one embodiment, the controller 114 is configured to employ a staggered startup of the storage devices 108. For example, the controller 114 may stagger the startup of storage devices 108 by a fixed time interval, such as 1 second, 2 seconds, etc. Alternatively, the controller 114 may dynamically control the startup of the storage devices 108 based on the power draw of these devices. The controller 114 may monitor the power draw from the power supplies 110 and 112 based on one or more status signals.

Furthermore, the controller 114 may comprise circuitry, logic, and/or software that maintain the operations of the storage device 106 within the limits of the power supplies 110 and 112. For example, the controller 114 may limit operations of the storage devices 108 to a maximum number of simultaneous drives running, etc.

The power controller 116 receives the DC voltage from the power supplies 110 and 112 and provides power to the other components of the storage device 106. For example, the power controller 116 may comprise a regulator circuit to maintain constant voltage levels during variations in the DC voltage from the power supplies 110 and 112. The power controller 116 may comprise various components, such as transistors, operational amplifiers, comparators, etc. For example, the power controller 116 may maintain the duty factor provided by each of the power supplies 110 and 112. In particular, the power controller 116 may receive a voltage feedback (such as from voltage comparators 210 and 212) and feed this signal into a capacitor (not shown) and inductor (not shown) to maintain an average duty factor delivered by the power supplies 110 and 112. In one embodiment, the power controller 116 comprises a high-efficiency DC-to-DC converter (such as converter 208) that converts the DC power from the power supplies 110 and 112 into one or more DC power signals, such as 12, 5, and 3.3 voltage signals.

The power controller 116 may draw power from the power supplies 110 and 112 in a variety of configurations. In one embodiment, the power controller 116 draws the full power of both the power supplies 110 and 112 to power the storage device 106. In another embodiment, the power controller 116 shares power load between power supplies 110 and 112. The power controller 116 may share power load equally or unequally between the power supplies 110 and 112. The power controller 116 may dynamically change the power load based on a number of factors, such as rating of the power supply, temperature, voltage, timing, temperature, etc.

In another embodiment, the power controller 116 may draw power from the power supplies 110 and 112 in a primary and backup configuration. For example, the power supply 110 may be the primary power supply and supply all or a majority of the power drawn by the power controller 116. The power supply 112 may thus be a supporting or backup power supply to the power supply 110. As a secondary power supply, the power supply 112 may be active, but providing a minority or relatively small portion of the power drawn by the power controller 116.

Storage 108 refers to the physical devices and medium on which the storage device 106 stores data. For example, storage 108 may comprise a disk controller, disks or magnetic media, solid-state memory, optical media, etc. As shown, the storage device 106 may comprise multiple storage devices 108 for purposes of capacity and redundancy. As a NAS device, the storage device 106 may support various RAID levels known to those skilled in the art.

Power supplies 110 and 112 are external power supplies. Those skilled in the art will recognize that external power supplies may be known as an AC adapter, an AC/DC adapter, an AC/DC converter, a wall wart, a wall cube, a power brick, a plug pack, a line power adapter, a power adapter, etc. As shown, the power supplies 110 and 112 may generally each comprise an AC plug 118, an AC/DC converter 120, and a DC plug 122. These components are known to those skilled in the art.

In one embodiment, the power supplies 110 and 112 may have the same rating, such as 120-Watts. In another embodiment, the power supplies 110 and 112 may have different ratings, such as 240-Watts and 120-Watts.

Figure 2:
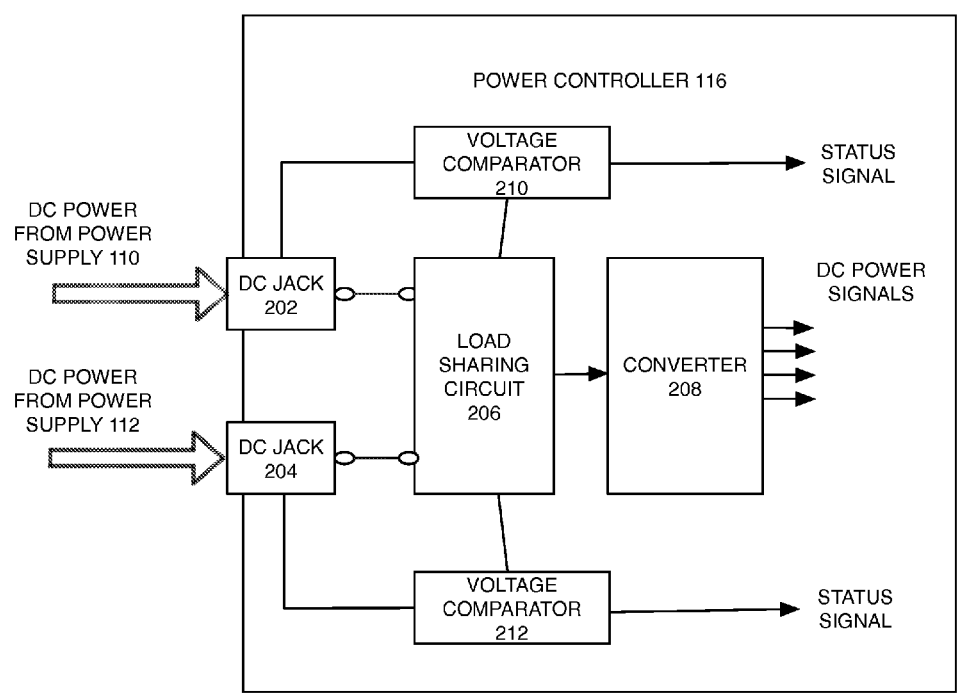
FIG. 2 shows an exemplary power controller that may be implemented in a storage device in accordance with one embodiment of the present invention.

FIG. 2 shows a simplified block diagram of the power controller 114. As shown, the power controller 114 may comprise DC jacks 202 and 204, a load sharing circuit 206, and voltage comparators 210 and 212. These components will now be further described.

DC jacks 202 and 204 may be any electrical connector for receiving DC power from the external power supplies 110 and 112. The DC jacks 202 and 204 may comprise a variety of form factors, such as cylindrical, snap and lock, IEC, and the like.

Load sharing circuit 206 receives power from the power supplies 110 and 112 and distributes power workload for the DC power received from the DC jacks 202 and 204, i.e., from the external power supplies 110 and 112. The load sharing circuit 206 may comprise various electrical components known to those skilled in the art. Load sharing circuit 206 may be implemented based on different components to provide various types of load sharing and to account for supply voltage variations that may occur in either of power supplies 110 and 112. The load sharing circuit 206 may distribute power load based on a variety of factors, such as temperature, current, voltage, etc.

The load sharing circuit 206 may be configured to utilize power supplies 110 and 112 in a primary/backup setup and provide a shared power output (e.g., that is provided to the converter 208). Alternatively, in one embodiment, the load sharing circuit 206 may provide its shared output based on active load sharing that adjusts output voltage of the power supplies 110 and 112 to provide a desired output current to the converter 208 and other components of storage device 100. If voltage from either power supply 110 or 112 goes out of regulation, then as an active circuit, the load sharing circuit 206 will automatically choose the power supply that is in regulation to its output DC voltage bus.

In one embodiment, the load sharing circuit 206 may be configured to provide a shared output based on a switching circuit that employs a set of Schottky diodes to switch between power supplies 110 and 112. In another embodiment, the load sharing circuit 206 may comprise a field-effect transistor (not shown) having a current sensor to provide a shared output from the power supplies 110 and 112. In yet another embodiment, the load sharing circuit 206 may implement a shared output using load balancing based on a switched inductor.

As shown, the load sharing circuit 206 is configured to provide a power output signal that is a shared output of the power from power supplies 110 and 112. A converter 208 may then convert this output from the load sharing circuit 206 into one or more appropriate power signals needed by the other components. In one embodiment, the converter 208 may comprise one or more DC-to-DC converters (not shown) to convert the one shared output DC power signal from the load sharing circuit 206 created from the power supplies 110 and 112 into a set of DC power signals used by the storage device 106. In one embodiment, the converter 208 may comprise at least one high efficiency DC-to-DC converter, such as a converter that provides 80% efficiency or more. As shown, the converter 208 may be configured to convert the shared output from load sharing circuit 106 into a plurality of DC power signals, such as 3.3, 5, and 12 volt signals, to provide power to the other components of the storage device 106, such as the controller 114 and the storage 108.

In one embodiment, the converter 208 may be a linear regulator to convert voltage from the load sharing circuit 206 into one or more DC output voltages. In another embodiment, the converter 208 may be a switching or switched mode regulator, for example, that maintains a desired output based on modulating the duty factor of power supplies 110 and 112 alone or in combination.

Voltage comparators 210 and 212 compares the voltage received at jacks 202 and 204 respectively and provides a status signal output to the load sharing circuit 206 and controller 114. Such status signals provide an indication as to the state of power received from the external power supplies 110 and 112. The voltage comparators 210 and 212 may be implemented using components known to those skilled in the art, such as an operation amplifier, an integrated circuit, etc.

In one embodiment, the controller 114 is responsive to these status signals and provides a notification, for example, if one of the power supplies 110 and 112 fails. The controller 114 may provide an error message to the host device 102 or another device via network 104.

Figure 3A:
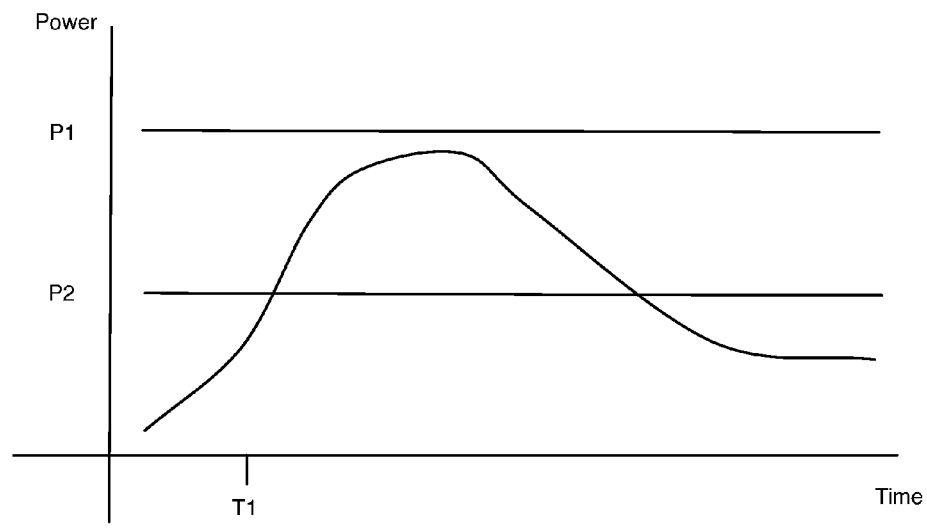
FIG. 3A shows an exemplary startup sequence of a prior art system.

FIG. 3A shows an exemplary startup sequence of a prior art system. As shown, in a typical NAS device, the device will start all or most of its disk drives at the same time. Accordingly, a typical NAS device requires a power supply that can support a relatively large peak power draw. For example, as shown, a prior art NAS device may commence start up at time T1, which then results in a peak power draw P1.

Figure 3B:
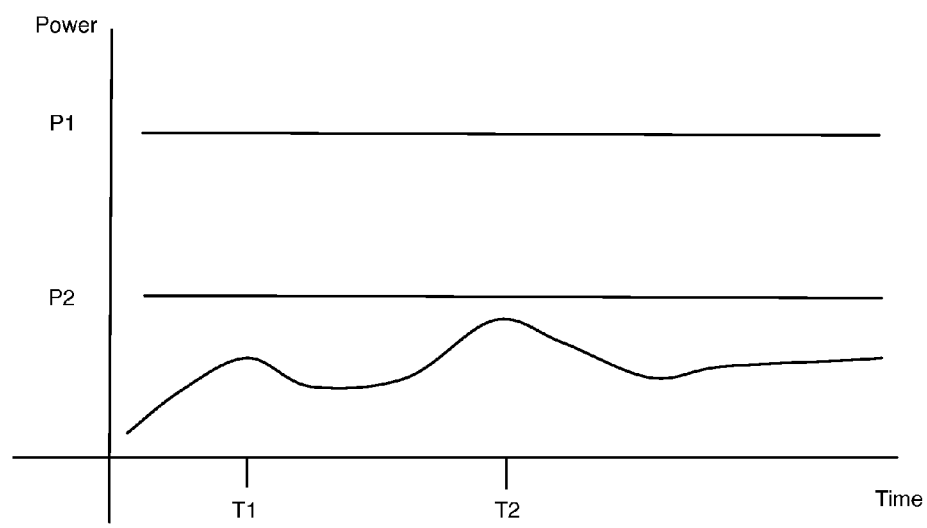
FIG. 3B shows an exemplary startup sequence of a storage system consistent with one embodiment of the present invention.

FIG. 3B shows an exemplary startup sequence of a storage system consistent with one embodiment of the present invention. In one embodiment, external power supplies 110 and 112 power the NAS storage device 106. As shown, in order to accommodate a lower power rating (such as 80 or 120 Watts) for the power supplies 110 and 112, the storage device 106 is configured to control its peak power draw less than power level P2. In one embodiment, the storage device 106 employs a staggered startup to accommodate the external power supplies. For example, as shown, at time T1, the NAS device 106 may start a first of its disk drives. At a later time T2, the NAS device 106 may then start a second of its disk drives. This staggering of the start up of disk drives thus maintains the power draw less than power P2.

The storage device 106 may employ other features to accommodate multiple external power supplies. For example, the storage device 106 may comprise fuses, a battery backup, etc. to limit current and/or voltage transients from causing failure in the power supplies 110 and 112.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A network attached storage (NAS) device, comprising:
   data storage comprising a plurality of storage devices;
   a controller coupled to and configured to manage the data storage and to communicate with a host computing device over a computer network;
   a first direct current (DC) jack configured to receive a first DC power signal from a first DC power supply, the first DC power supply being configured as a primary power supply to the NAS device and being external to and away from the NAS device and configured to draw alternating current (AC) power signal from a first wall AC power outlet and to provide the first DC power signal to the NAS device via the first DC jack;
   a second DC jack having a same form factor as the first DC jack, the second DC jack configured to receive a second DC power signal from a second DC power supply, the second DC power supply configured to supply a smaller amount of power than the first DC power supply and to operate as a backup power supply to the NAS device, the second DC power supply being external to and away from the NAS device, separate from the first DC power supply and configured to draw AC power signal from a second wall AC power outlet and to provide the second DC power signal to the NAS device via the second DC jack; and
   a single power controller, the single power controller being coupled to the first and second DC jacks, the single power controller being separate from the first DC power supply and the second DC power supply, and the single power controller comprising:
  a load sharing circuit comprising a switching circuit, the load sharing circuit being coupled to the first and second DC jacks and configured to:
    actively share, using the switching circuit, a load between the first DC power signal provided by the first DC power supply and the second DC power signal provided by the second DC power supply and to provide a shared power output signal;
    wherein actively sharing comprises adjusting output voltages of the first DC power supply and the second DC power supply to provide a desired output as the shared power output signal;
  a DC-DC converter configured to receive the shared power output signal from the load sharing circuit and to provide a plurality of output DC power signals to power at least the controller and the data storage;
  a first voltage comparator coupled to the first DC jack and to the load sharing circuit; and
  a second voltage comparator coupled to the second DC jack and to the load sharing circuit, the first and second voltage comparators being configured to compare voltages at the first and second DC jacks, to generate status signals that are indicative of a state of the first and second DC power signals and to provide the generated status signals to the load sharing circuit;
wherein the controller is further configured to monitor and sense a status of the first and second DC power supplies and to send a failure notification to the host computing device over the computer network responsive to a failure of the monitored first or second DC power supplies being sensed, such that a failed one of the first and second DC power supplies is repairable or replaceable while the NAS device is powered by the other one of the first and second DC power supplies.

2. The NAS device of claim 1, wherein the load sharing circuit is further configured to receive the first DC power signal at a first voltage from the first DC jack and to receive the second DC power signal at a second voltage that is different from the first voltage from the second DC jack.

3. The NAS device of claim 1, wherein the first voltage comparator is further configured to sense a status of the first DC power supply and to generate a first status signal at least responsive to failure of the first DC power supply being sensed, and wherein the second voltage comparator is further configured to sense a status of the second DC power supply and to generate a second status signal at least responsive to failure of the second DC power supply being sensed.

4. The NAS device of claim 1, wherein the first and second DC power supplies have a power rating that is lower than would have been necessary had the first and second DC power supplies been internal to the NAS device and wherein the single power controller is further configured to provide the plurality of output DC power signals while drawing from the first and second DC power supplies.

5. The NAS device of claim 4, wherein the load sharing circuit is further configured to receive the first and second DC power signals from the first and second external DC power supplies, each being rated at 120 Watts or less.

6. The NAS device of claim 1, wherein the controller is further configured to manage a startup of the data storage to limit a power draw thereof.

7. The NAS device of claim 1, wherein the data storage comprises at least one hard disk drive.

8. The NAS device of claim 1, wherein the NAS device is configured to withstand less heat than would be necessary had the first and second DC power supplies been internal to the NAS device.

9. The NAS device of claim 1, wherein the form factor of the first DC jack and the second DC jack comprises one of a cylindrical form factor, a snap and lock form factor, and an IEC form factor.

10. The NAS device of claim 1, wherein the controller is further configured to:
  determine a power draw of the plurality of storage devices;
  determine available power from the first DC power supply and the second DC power supply; and
  stagger startup of the plurality of storage devices based on their determined power draw and the available power from the first and second DC power supplies.

11. A system, comprising:
  a network attached storage (NAS) device;
  a first direct current (DC) power supply that is separate from and external to the NAS device and configured to draw alternating current (AC) power signal from a first wall AC power outlet and to provide a first DC power signal to the NAS device as a primary power supply to the NAS device; and
  a second DC power supply, separate from and external to the first DC power supply and the NAS device, the second DC power supply being configured to supply a smaller amount of power than the first DC power supply and to operate as a backup power supply to the NAS device, the second DC power supply being configured to draw AC power signal from a second wall AC power outlet and to provide a second DC power signal to the NAS device,
  wherein the NAS device comprises:
    data storage comprising a plurality of storage devices;
    a controller coupled to and configured to manage the data storage and to communicate with a host computing device over a computer network;
    a first DC jack configured to receive the first DC power signal from the first DC power supply;
    a second DC jack having a same form factor as the first DC jack, the second DC jack configured to receive the second DC power signal from the second DC power supply; and
    a single power controller, the single power controller being coupled to the first and second DC jacks, the single power controller being separate from the first DC power supply and the second DC power supply, and the single power controller comprising:
      a load sharing circuit comprising a switching circuit, the load sharing circuit being coupled to the first and second DC jacks and configured to:
        actively share, using the switching circuit, a load between the first DC power signal provided by the first DC power supply and the second DC power signal provided by the second DC power supply and to provide a shared power output signal;
        wherein actively sharing comprises adjusting output voltages of the first DC power supply and the second DC power supply to provide a desired output as the shared power output signal;
      a DC-DC converter configured to receive the shared power output signal from the load sharing circuit and to provide a plurality of output DC power signals to power at least the controller and the data storage;

a first voltage comparator coupled to the first DC jack and to the load sharing circuit; and a second voltage comparator coupled to the second DC jack and to the load sharing circuit, the first and second voltage comparators being configured to compare voltages at the first and second DC jacks, to generate status signals that are indicative of a state of the first and second DC power signals and to provide the generated status signals to the load sharing circuit;

wherein the controller is further configured to monitor and sense a status of the first and second DC power supplies and to send a failure notification to the host computing device over the computer network responsive to a failure of the monitored first or second DC power supplies being sensed, such that a failed one of the first and second DC power supplies is repairable or replaceable while the NAS device is powered by the other one of the first and second DC power supplies.

12. The system of claim 11, wherein the load sharing circuit is further configured to draw a majority of a power needed by the NAS device from the first DC power signal and is further configured to draw a comparatively smaller portion of the power needed by the NAS device from the second DC power signal.

13. The system of claim 11, wherein the load sharing circuit is further configured to receive the first DC power signal at a first voltage from the first DC jack and to receive the second DC power signal at a second voltage that is different from the first voltage from the second DC jack.

14. The system of claim 11, wherein the first voltage comparator is further configured to sense a status of the first DC power supply and to generate a first status signal at least responsive to failure of the first DC power supply being sensed, and wherein the second voltage comparator is further configured to sense a status of the second DC power supply and to generate a second status signal at least responsive to failure of the second DC power supply being sensed.

15. The system of claim 11, wherein the first and second DC power supplies have a power rating that is lower than would have been necessary had the first and second DC power supplies been internal to the NAS device and wherein the single power controller is further configured to provide the plurality of output DC power signals while drawing from the first and second DC power supplies.

16. The system of claim 15, wherein the load sharing circuit is configured to receive the first and second DC power signals from the first and second external DC power supplies, each being rated at 120 Watts or less.

17. The system of claim 11, wherein the controller is configured to manage a startup of the data storage to limit a power draw thereof.

18. The system of claim 11, wherein the data storage comprises at least one hard disk drive.

19. The system of claim 11, wherein the NAS device is configured to withstand less heat than would be necessary had the first and second DC power supplies been internal to the NAS device.

20. The system of claim 11, wherein the form factor of the first DC jack and the second DC jack comprises one of a cylindrical form factor, a snap and lock form factor, and an IEC form factor.

21. The system of claim 11, wherein the controller is further configured to:
determine a power draw of the plurality of storage devices;
determine available power from the first DC power supply and the second DC power supply; and
stagger startup of the plurality of storage devices based on their determined power draw and the available power from the first and second DC power supplies.

* * * * *